US010842013B2

(12) United States Patent
Sato et al.

(10) Patent No.: US 10,842,013 B2
(45) Date of Patent: Nov. 17, 2020

(54) PLASMA ACTUATOR

(71) Applicant: TOHOKU UNIVERSITY, Sendai (JP)

(72) Inventors: Shintaro Sato, Sendai (JP); Naofumi Ohnishi, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 0 days.

(21) Appl. No.: 16/735,870

(22) Filed: Jan. 7, 2020

(65) Prior Publication Data

US 2020/0221565 A1 Jul. 9, 2020

(30) Foreign Application Priority Data

Jan. 7, 2019 (JP) ................................ 2019-000603

(51) Int. Cl.
*B64C 23/00* (2006.01)
*B64C 23/06* (2006.01)
*H05H 1/48* (2006.01)

(52) U.S. Cl.
CPC .................................... *H05H 1/48* (2013.01)

(58) Field of Classification Search
CPC ........ H05H 1/48; B64C 23/00; B64C 23/005; B64C 23/06; B64G 1/40
USPC ..................................................... 315/111.21
See application file for complete search history.

(56) References Cited

U.S. PATENT DOCUMENTS 3,095,163 A * 6/1963 Hill ........................ B64C 23/005 244/12.1
2019/0224354 A1* 7/2019 Ma ............................ A61L 2/14

FOREIGN PATENT DOCUMENTS

JP 2015-161269 A 9/2015
JP 2017-076518 A 4/2017

OTHER PUBLICATIONS

Moreau, "Control of a turbulent flow separated amid-chord along an airfoil with DBD plasma actuators", Aug. 26, 2016 (Year: 2016).*
R. Sosa et al. "Study of the Flow Induced by a Sliding Discharge". IEEE Transactions on Dielectrics and Electrical Insulation, vol. 16, No. 2, pp. 305-311, Apr. 2009.
Eric Moreau et al., "Electric Wind Produced by Surface Plasma Actuators: A New Dielectric Barrier Discharge Based on a Three-Electrode Geometry". Journal of Physics D: Applied Physics, vol. 41, pp. 1-12, May 9, 2008.

(Continued)

*Primary Examiner* — Henry Luong
(74) *Attorney, Agent, or Firm* — Oliff PLC

(57) ABSTRACT

A small and inexpensive plasma actuator is capable of accelerating induced flow and increasing the effect of controlling flow. A plurality of electrode pairs are disposed on a dielectric layer upstream to downstream along a predetermined direction. Each electrode pair includes an upstream electrode disposed on one surface of the dielectric layer and a downstream electrode disposed on another surface of the dielectric layer to sandwich the dielectric layer between the upstream electrode. A lowest electrode is on the one surface of the dielectric layer displaced downstream from the downstream electrode in an the most downstream electrode pair to have the same potential as the downstream electrode. A voltage application device is configured to apply voltage including AC voltage or repeated pulse voltage to each electrode pair such that the potential of the applied voltage inverts at adjacent electrode pairs.

7 Claims, 5 Drawing Sheets

(56) References Cited

OTHER PUBLICATIONS

R. Sosa et al. "Circular Cylinder Drag Reduction by Three-Electrode Plasma Actuators". Journal of Physics: Conference Series 166, pp. 1-14, 2009 (year of publication is sufficiently early that month is not an issue).
Eric Moreau et al., "Control of a Turbulent Flow Separated at Mid-Chord Along an Airfoil With DBD Plasma Actuators". Journal of Electrostatics, vol. 83, pp. 78-87, Aug. 26, 2016.
Antione Debien et al. "Streamer Inhibition for Improving Force and Electric Wind Produced by DBD Actuators". Journal of Physics D: Applied Physics, vol. 45, pp. 1-13, May 10, 2012.
Asaumi, Norio. "Research on multi-electrode plasma actuator for turbomachinery applications". Tottori University Doctoral Dissertation. 124 pages, Jan. 2018.
Forte et al. "Optimization of a dielectric barrier discharge actuator by stationary and non-stationary measurements of the induced flow velocity: application to airflow control". Exp Fluids, vol. 43, p. 917-928, 2007.
Furukawa, Haruki et al. "Experimental investigation toward thrust improvement in multiple-electrodes plasma actuator". Abstract. Bulletin of the American Physical Society, 71st Annual Gaseous Electronics Conference, 2018.
Furukawa, Haruki et al. "Experimental investigation of multiple electrode plasma actuators". Abstract. Proceedings of Japan Society of Mechanical Engineers Annual Conference, 2018.
Opaits, Dmitry F. et al. "Improving Thrust by Suppressing Charge Build-up in Pulsed DBD Plasma Actuators". 47th AIAA Aerospace Sciences Meeting, p. 1-8, Jan. 5-8, 2009.
Sato, Shintaro et al. "Influence of Voltage Waveform on Electrohydrodynamic Force in a Dielectric-Barrier-Discharge Plasma Actuator." 55th AIAA Aerospace Sciences Meeting, p. 1-9, Jan. 9-13, 2017.
Sato, Shintaro et al. "Induced Flow Simulation with Detailed Discharge Modeling in Dielectric-Barrier-Discharge Plasma Actuator". AIAA Aerospace Sciences Meeting, p. 1-8, Jan. 8-12, 2018.
Sato, Shintaro et al. "Discharge Process and Gas Heating Effect in Nanosecond-Pulse-Driven Plasma Actuator". AIAA SciTech Forum, p. 1-8, Jan. 7-11, 2019.
Sato, Shintaro et al. "Enhanced electrohydrodynamic force generation in a two-stroke cycle dielectric-barrier-discharge plasma actuator". Applied Physics Letters, vol. 110, 194101-1-194101-4. 2017.
Sato, Shintaro et al. "Theoretical modeling of pulse discharge cycle in dielectric barrier discharge plasma actuator". Japanese Journal of Applied Physics, vol. 55, 07LD04-1-07LD04-7. 2016.
Sato, Shintaro et al. "Proposal of a Plasma Actuator for Enhanced Electrohydrodynamic Force Generation toward Low-Voltage Operation". Proceedings of 32nd International Symposium on Space Technology and Science, p. 1-6, Jun. 15-21, 2019.
Sato, Shintaro et al. "Measurement of induced flow velocity in low-voltage operated plasma actuator". Proceedings of 63rd Japan Society for Aeronautical and Space Sciences Conference, p. 1-5, Nov. 6-8, 2019.
Sato, Shintaro et al. "Proposal of a plasma actuator for enhancement of electrohydrodynamic force generation". Abstract. Proceedings of Japan Society of Mechanical Engineers Annual Conference, 2018.
Sato, Shintaro et al. "A study of integrated plasma actuator toward low-voltage operation". Abstract. Proceedings of Japan Society of Mechanical Engineers Annual Meeting, 2019.
Sato, Shintaro et al. "Successively accelerated ionic wind with integrated dielectric-barrier-discharge plasma actuator for low-voltage operation". Scientific Reports, p. 1-11, 2019.
Sato, Shintaro et al. "Computational Study of Body Force Production Process and Performance Improvement in Dielectric-Barrier-Discharge Plasma Actuator". Trans. JSASS Aerospace Tech. Japan vol. 16, No. 6, p. 550-555, 2018.

* cited by examiner

PLASMA ACTUATOR

FIELD OF THE INVENTION

The present invention relates to a plasma actuator.

DESCRIPTION OF RELATED ART

The development of fluid control devices for preventing flow separation around airplane wings and reducing fluid dynamic noise has been a subject of study for many years. In the prior art, many passive fluid control devices have been developed. In recent years, active fluid control devices have become more popular, with researchers working in particular to develop plasma actuators that use ionic wind induced by discharge to control air flow.

Examples of technologies that have been developed include a fluid control system that uses a single plasma actuator consisting of two electrodes and a dielectric in order to effectively control flow separation around wings (see, for example, Patent Document 1), and plasma actuator that controls the direction of air flow by controlling the position of generated plasma, in which a first electrode formed on a dielectric layer, a pair of second electrodes formed into a comb-shape on another dielectric layer facing each other, and a pair of third electrodes formed into a comb-shape on yet another dielectric layer facing each other are stacked via dielectric layers (see, for example, Patent Document 2).

There has also been developed a technology of exposing a downstream side of a lower electrode that is normally completely covered with a dielectric in order to improve the performance of a single plasma actuator (see, for example, Non-patent Document 1), and a plasma actuator in which an exposed electrode has been added and which uses three electrodes (see, for example, Non-patent Document 2).

A plurality of plasma actuators may be arranged in a row to improve performance. However, in one experiment in which two plasma actuators with the same electrical layout were arranged in a row, insufficient distance between the plasma actuators caused air flow in a direction opposite to the main air flow. As a result, the main air flow could not be effectively accelerated (see, for example, Non-patent Document 3).

CITATION LIST

Patent Literature 1: JP-A-2015-161269
Patent Literature 2: JP-A-2017-76518
Non-patent Literature 1: D. F. Opaits et al, "Improving Thrust by Suppressing Charge Build-up in Pulsed DBD Plasma Actuators", 47th AIAA Aerospace Sciences Meeting Including The New Horizons Forum and Aerospace Exposition, 5-8 Jan. 2009, Orlando, Fla., AIAA 2009-487
Non-patent Literature 2: N. Asaumi, "Study on Multi-electrode Plasma Actuators for Turbomachinery Application", Tottori University, Doctoral Thesis, 2018
Non-patent Literature 3: M. Forte, J. Jolibois, J. Pons, E. Moreau, G. Touchard, and M. Cazalens, "Optimization of a dielectric barrier discharge actuator by stationary and non-stationary measurements of the induced flow velocity: application to airflow control", Exp. Fluids, 2007, 43, 917-928

SUMMARY OF THE INVENTION

The plasma actuators disclosed in Patent Documents 1 and 2 have improved effects in the control range and can control the direction of air flow according to the situation. However, the power supply devices in these actuators are large and costly because a sufficient control effect cannot be obtained unless alternating voltage at an interpeak voltage of around 20 to 40 kV is applied. In the plasma actuator disclosed in Non-patent Document 1, increasing the applied voltage for achieving the effect of air flow control causes arc discharge and electrodes to erode. Thus, there is a need to suppress the applied voltage, which results in an insufficient control effect. In the plasma actuator disclosed in Non-patent Document 2, a difference in potential is formed between covered electrodes and newly added exposed electrodes. As a result, discharge occurs in a direction opposite to the main air flow direction when voltage of the added exposed electrode increases and induced air flow deviates from the intended direction. Because of this, a sufficient air flow control effect cannot be achieved.

As described in Non-patent Document 3, even arranging a plurality of plasma actuators having the same electrode layout in a row results in air flow in the opposite direction. Thus, induced air flow cannot be accelerated and a substantial effect of air flow control cannot be achieved.

The present invention has been made in light of the above-described problems, and an object of the present invention is to provide a small and inexpensive plasma actuator capable of accelerating induced air flow and increasing the effect of controlling air flow.

In order to achieve the above object, a plasma actuator according to the present invention includes a dielectric layer, a plurality of electrode pairs disposed on the dielectric layer upstream to downstream in a predetermined direction along one surface of the dielectric layer, a lowest electrode disposed on the dielectric layer on a downstream side of each of the plurality of electrode pairs, and voltage application means configured to apply voltage including AC voltage or repeated pulse voltage to each of the plurality of electrode pairs, each of the plurality of electrode pairs including an upstream electrode disposed closer to one surface of the dielectric layer, and a downstream electrode disposed closer to another surface of the dielectric layer and displaced downstream from the upstream electrode so as to sandwich the dielectric layer between the upstream electrode, in which, in adjacent electrode pairs, the upstream electrode of the downstream electrode pair is displaced downstream from the downstream electrode of the upstream electrode pair, the lowest electrode is disposed closer to the one surface of the dielectric layer and displaced downstream from the downstream electrode in a most downstream electrode pair so as to have the same potential as the downstream electrode in the most downstream electrode pair, and the voltage application means is configured to apply the voltage such that polarity of the applied voltage is inverted at adjacent electrode pairs.

The plasma actuator according to the present invention can use the voltage application means to generate discharge plasma between the upstream electrode and the downstream electrode in each electrode pair and induce upstream to downstream flow by applying voltage including AC voltage or repeated pulse voltage. The plasma actuator is configured such that, at this time, the polarity of the voltage applied by the voltage application means is inverted at adjacent electrode pairs. Thus, among the adjacent electrode pairs, potential of the downstream electrode in an upstream electrode pair and potential of the upstream electrode in a downstream electrode pair can be made constantly equal. Further, because the lowest electrode is configured to have the same potential as the downstream electrode in the most downstream electrode pair, the potential of the lowest electrode and the potential of the downstream electrode in the most downstream electrode can be made constantly equal. As a result, discharge can be prevented from occurring between electrodes and flow opposite to the flow induced at each electrode pair can be prevented.

The plasma actuator according to the present invention is configured such that the polarity of the voltage applied by the voltage application means is inverted at adjacent electrode pairs. Thus, charge on the dielectric layer deposited due to discharge generated at each electrode pair can be removed by the upstream electrodes in adjacent electrode pairs on the downstream side. Further, charge on the dielectric layer deposited due to discharge generated at the most downstream electrode pair can be removed by the lowest electrode because the lowest electrode is disposed so as to have the same potential as the downstream electrode in the most downstream electrode pair. Thus, the charge on the dielectric layer deposited by discharge generated at each electrode pair can be prevented from impeding the flow induced at each electrode pair. As a result, induced flow can be accelerated upstream to downstream and the effect of controlling flow can be increased. Further, control effects similar to that in the prior art can be achieved even when the voltage applied by the voltage application means is decreased. Thus, the voltage application means can be made smaller to achieve a small and inexpensive configuration.

With the plasma actuator according to the present invention, the voltage application means is preferably configured such that voltage is applied to either of the upstream electrode and the downstream electrode in each electrode pair and, at this time, the other of the upstream electrode and the downstream electrode in each electrode pair is grounded. In this case, if, for example, the voltage application means may be configured to ground the downstream electrode in an odd-numbered electrode pair from the upstream side and the upstream electrode in an even-numbered electrode pair from the upstream side when the voltage application means has applied voltage to the upstream electrode in an odd-numbered electrode pair from the upstream side and the downstream electrode in an even-numbered electrode pair from the upstream side, or the voltage application means may be configured to ground the upstream electrode in an odd-numbered electrode pair from the upstream side and the downstream electrode in an even-numbered electrode pair from the upstream side when the voltage application means has applied voltage to the downstream electrode in an odd-numbered electrode pair from the upstream side and the upstream electrode in an even-numbered electrode pair from the upstream side. With this configuration, the polarity of voltage applied by the voltage application means can be inverted at adjacent electrode pairs.

With the plasma actuator according to the present invention, the voltage is preferably voltage obtained by superimposing the AC voltage or the repeated pulse voltage with DC voltage. In this case, charged particles of discharged plasma generated by the AC voltage or repeated pulse voltage can be accelerated by the DC voltage. With this configuration, induced flow can be further accelerated and the effect of controlling flow can be further increased. Further, the voltage application means may have any configuration provided that the voltage application means can apply voltage obtained by superimposing the AC voltage or the repeated pulse voltage with DC voltage. For example, the voltage application means may be a combination of an AC power supply or a pulse power supply and a DC power supply, or a combination of a DC power supply and switches.

When the voltage application means is configured of a combination of a DC power supply and switches, for example, the voltage application means may include the DC power supply, a first switch, and a second switch. Further, the voltage application means may be configured such that either of the upstream electrode and the downstream electrode in each electrode pair is electrically coupled to the DC power supply via the first switch and grounded via the second switch, and the other of the upstream electrode and the downstream electrode in each electrode pair is grounded. Further, an operation in which the first switch is turned on and the second switch is turned off, and the first switch is turned off and the second switch is turned on may be repeated. The voltage application means may further include the DC power supply, a first switch, a second switch, a third switch, and a fourth switch, and be configured such that either of the upstream electrode and the downstream electrode in each electrode pair is electrically coupled to the DC power supply via the first switch and grounded via the second switch, and the other of the upstream electrode and the downstream electrode in each electrode pair is electrically coupled to the DC power supply via the third switch and grounded via the fourth switch. Further, an operation in which the first switch and the fourth switch are turned on and the second switch and the third switch are turned off, and the first switch and the fourth switch are turned off and the second switch and the third switch are turned on may be repeated.

When one electrode pair is provided, the plasma actuator according to the present invention preferably includes a dielectric layer, an upstream electrode disposed closer to one surface of the dielectric layer, a downstream electrode disposed closer to another surface of the dielectric layer and displaced downstream from the upstream electrode so as to sandwich the dielectric layer between the upstream electrode, a lowest electrode disposed closer to the one surface of the dielectric layer and displaced downstream from the downstream electrode so as to have the same potential as the downstream electrode, and voltage application means configured to apply voltage including AC voltage or repeated pulse voltage to either of the upstream electrode and the downstream electrode and, when the voltage is applied to one of the upstream electrode and the downstream electrode, ground the other of the upstream electrode and the downstream electrode. Even with such a configuration, induced flow can be accelerated and the effect of controlling flow can be enhanced. Further, the plasma generator can adopt a small and inexpensive configuration. Even with such a configuration, the voltage is preferably obtained by superimposing AC voltage or repeated pulse voltage with DC voltage.

In the plasma actuator according to the present invention, the upstream electrode and the lowest electrode may be divided into a pair of separated electrodes aligned in the predetermined direction, and a separated electrode on an upstream side or a downstream side in each pair of separated electrodes may be coupled to a resistor. In this case, the resistor can control current that flows through the upstream or downstream separated electrode in each pair. With this configuration, even the applied voltage is high or if the interval between upstream electrodes in adjacent electrode pairs is small, the electric field formed between upstream electrodes of adjacent electrode pairs can be weakened and transition to arc discharge can be prevented.

The plasma actuator according to the present invention consists of a multiple electrode plasma actuator and is a plasma actuator including a plurality of high-voltage electrodes and ground electrodes so as to sandwich a dielectric.

Such a plasma actuator may have the following configuration: a first upper electrode, a first lower electrode, and a second upper electrode are used as a high-voltage electrode, a ground electrode, and a ground electrode, respectively, and a first plasma forming space is formed between the first upper electrode and the second upper electrode. A second lower electrode and a third upper electrode are both used as high-voltage electrodes, and a second plasma forming space is formed between the second upper electrode and a third upper electrode. AC voltage or a repeated pulse voltage waveform superimposed with DC voltage is applied to each high-voltage electrode. This configuration corresponds to a case where two electrode pairs are provided and the dielectric is a layer-shaped dielectric layer, where the first upper electrode and the first lower electrode, and the second upper electrode and the second lower electrode form electrode pairs, respectively. The first upper electrode and the second upper electrode correspond to the upstream electrode of each electrode pair, the first lower electrode and the second lower electrode correspond to the downstream electrode of each electrode pair, and the third upper electrode corresponds to the lowest electrode. On one surface of the dielectric layer in a pair, the first upper electrode, the second upper electrode, and the third upper electrode are arranged on the upper side, and the first lower electrode and the second lower electrode are arranged on the lower side.

In this case, the plasma actuator has a structure where an n-th upper electrode (n is equal to 1, 2 to 3) is divided into an $n_1$-th upper electrode and an $n_2$-th upper electrode, and a resistor for limiting current flowing to the $n_1$-th upper electrode has been added. With this configuration, the plasma actuator can have the function of preventing a transition to arc discharge. The electrodes may have a structure where the first upper electrode, the first lower electrode, the second upper electrode, and the second lower electrode are repeatedly disposed such that the third upper electrode becomes the first upper electrode. If two or more electrode pairs are to be provided, an m-th upper electrode and an m+1-th lower electrode may be used as high-voltage electrodes and an m-th lower electrode and an m+1-th upper electrode may be used as ground electrodes (m is an odd number equal to or greater than 1), and a plasma forming space may be formed between adjacent upper electrodes. Further, each high-voltage electrode may be applied with an AC voltage or repeated pulse voltage waveform superimposed with DC voltage. At this time, the electrodes may have a structure where the m-th upper electrode is divided into an $m_1$-th upper electrode and an $m_2$-th upper electrode, and the m+1-th upper electrode is divided into an $(m+1)_1$-th upper electrode and an $(m+1)_2$-th upper electrode, and a resistor has been added to the $m_1$-th upper electrode and the $(m+1)_1$-th upper electrode.

According to the present invention, it is possible to provide a small and inexpensive plasma actuator capable of accelerating induced flow and increasing the effect of controlling flow.

BRIEF DESCRIPTION OF THE DRAWINGS

FIG. 5A is a graph showing the relationship between DC voltage and induced airflow and FIG. 5B is a cross-sectional diagram illustrating electrode layouts (cases 1 to 4) used in the performance evaluation test.

FIG. 8A is a graph showing a speed profile of air flow induced when the frequency of repeated pulse voltage applied using voltage application means is 50 kHz, 100 kHz and DC voltage is 1200 V and FIG. 8B is a graph showing a speed profile of air flow induced when the frequency of repeated pulse voltage applied using voltage application means is 50 kHz, 100 kHz and DC voltage is 1500 V.

DETAILED DESCRIPTION OF THE INVENTION

Figure 1:
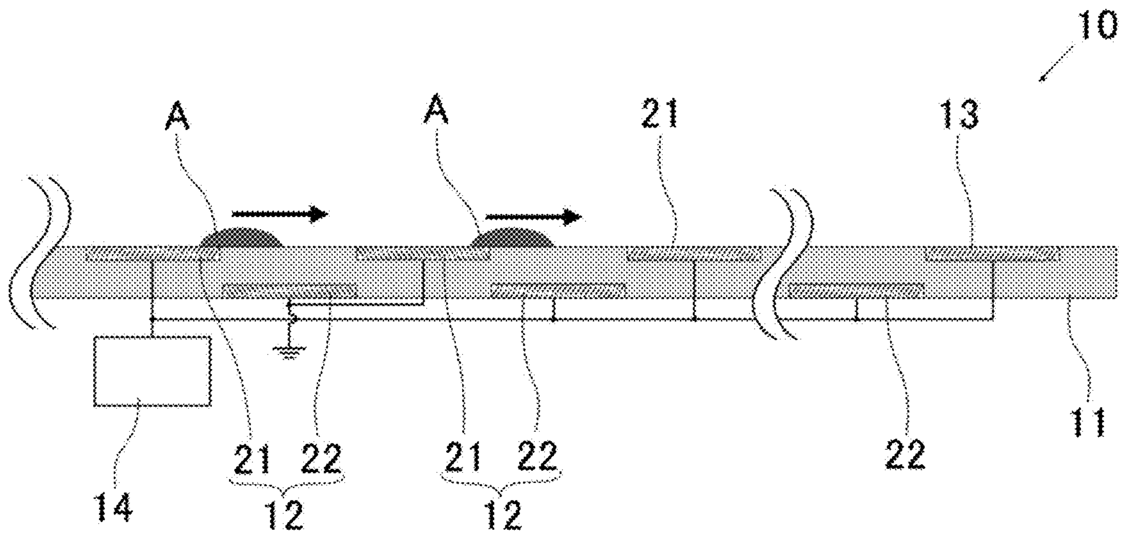
FIG. 1 is a cross-sectional diagram illustrating a plasma actuator according to an embodiment of the present invention.

An embodiment of the present invention will be described below with reference to the drawings.

FIGS. 1 to 9 illustrate a plasma actuator according to an embodiment of the present invention.

As illustrated in FIGS. 1 to 4, a plasma actuator 10 includes a dielectric layer 11, a plurality of electrode pairs 12, a lowest electrode 13, and a voltage application means 14.

As illustrated in FIG. 1, the dielectric layer 11 is formed of a dielectric and has a predetermined thickness. The dielectric layer 11 may be made of various materials. In the specific example illustrated in FIG. 1, the dielectric layer 11 is made of a polyimide film.

Each electrode pair 12 is disposed in a predetermined direction upstream to downstream along one surface of the dielectric layer 11. Each electrode pair 12 includes an upstream electrode 21 disposed on one surface of the dielectric layer 11 and a downstream electrode 22 disposed on another surface of the dielectric layer 11 displaced downstream from the upstream electrode 21. Each electrode pair 12 is disposed such that the dielectric layer 11 is sandwiched by the upstream electrode 21 and the downstream electrode 22. Adjacent electrode pairs 12 are formed such that the upstream electrode 21 of a downstream electrode pair 12 is displaced downstream from the downstream electrode 22 of an upstream electrode pair 12. In the specific example illustrated in FIG. 1, the upstream electrode 21 and the downstream electrode 22 are made of copper tape. In the specific example illustrated in FIG. 1, three or more electrode pairs 12 are provided, but two electrode pairs 12 may be provided. There may also be one electrode pair 12.

The lowest electrode 13 is displaced downstream from the downstream electrode 22 in the most downstream electrode pair 12 on one surface of the dielectric layer 11. The lowest electrode 13 is electrically coupled to the downstream electrode 22 in the most downstream electrode pair 12 so as to have the same potential as the downstream electrode 22. In the specific example illustrated in FIG. 1, the lowest electrode 13 is made of copper tape.

Figure 2:
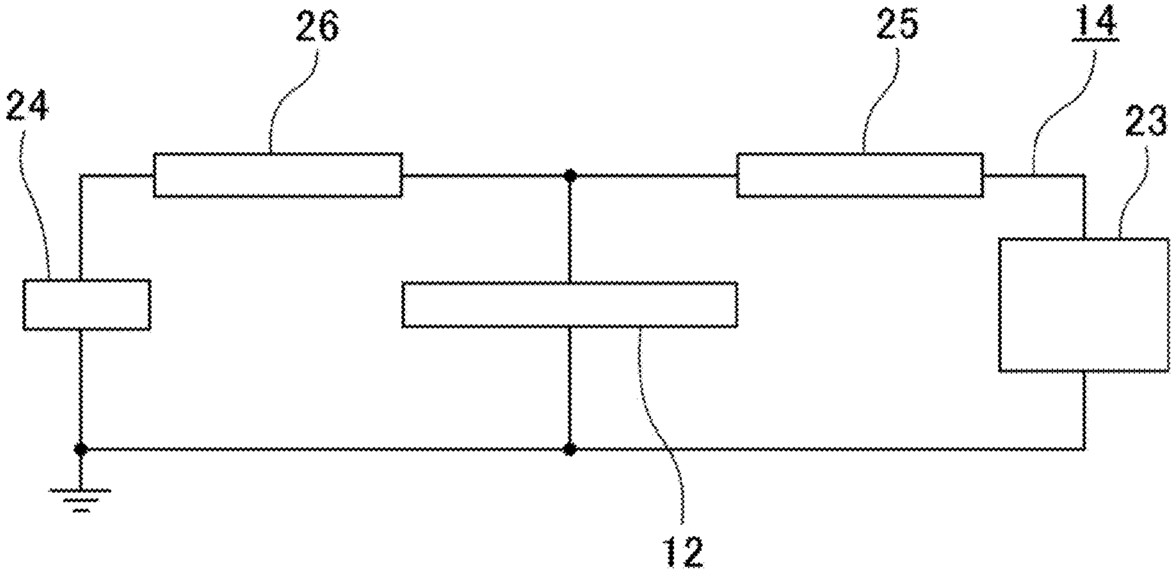
FIG. 2 is a block diagram illustrating an electrode layout in a plasma actuator according to an embodiment of the present invention.

As illustrated in FIG. 2, the voltage application means 14 includes an AC power supply/pulse power supply 23, a DC power supply 24, a high-pass filter 25, and a low-pass filter 26. The AC power supply/pulse power supply 23 and the DC power supply 24 are coupled to each electrode pair 12. The high-pass filter 25 is disposed between the AC power supply/pulse power supply 23 and each electrode pair 12 such that the AC power supply/pulse power supply 23 is not damaged by voltage output from the DC power supply 24. The low-pass filter 26 is disposed between the DC power supply 24 and each electrode pair 12 such that the DC power supply 24 is not damaged by voltage output from the AC power supply/pulse power supply 23. With this configuration, the voltage application means 14 can apply voltage obtained by superimposing AC voltage or repeated pulse voltage with DC voltage to each electrode pair 12.

The voltage application means 14 is configured to apply voltage to either of the upstream electrode 21 and the downstream electrode 22 of each electrode pair 12 and ground the other of the upstream electrode 21 and the downstream electrode 22 such that the polarity of the applied voltage is inverted at adjacent electrode pairs 12. In other words, the voltage application means 14 may be configured to apply voltage to the upstream electrode 21 in an odd-numbered electrode pair 12 from the upstream side and to the downstream electrode 22 in an even-numbered electrode pair 12 from the upstream side, and ground the downstream electrode 22 in an odd-numbered electrode pair 12 from the upstream side and the upstream electrode 21 in an even-numbered electrode pair 12 from the upstream side. Alternatively, the voltage application means 14 may be configured to apply voltage to the downstream electrode 22 in an odd-numbered electrode pair 12 from the upstream side and the upstream electrode 21 in an even-numbered electrode pair 12 from the upstream side, and ground the upstream electrode 21 in an odd-numbered electrode pair 12 from the upstream side and the downstream electrode 22 in an even-numbered electrode pair 12 from the upstream side.

In the specific example illustrated in FIG. 1, the voltage application means 14 is configured to electrically couple and apply voltage to the upstream electrode 21 in the first electrode pair 12 from the upstream side and the downstream electrode 22 in the second electrode pair 12 from the upstream side, and ground the downstream electrode 22 in the first electrode pair 12 from the upstream side and the upstream electrode 21 in the second electrode pair 12 from the upstream side. With this configuration, voltage can also be applied to the lowest electrode 13.

Next, effects will be described.

First, the plasma actuator 10 generates discharge plasma between the upstream electrode 21 and the downstream electrode 22 of each electrode pair 12 through the voltage application means 14 applying voltage obtained by superimposing AC voltage or repeated pulse voltage with DC voltage. With this, as illustrated in FIG. 1, plasma is formed between upstream electrodes 21 in adjacent electrode pairs 12 on one surface of the dielectric layer 11 and in a discharge region A between the upstream electrode 21 and the lowest electrode 13 of the most downstream electrode pair 12. Further, upstream to downstream airflow (arrow in FIG. 1) can be induced.

At this time, the plasma actuator 10 is configured such that the polarity of voltage applied by the voltage application means 14 is inverted at adjacent electrode pairs 12. Thus, among the adjacent electrode pairs 12, the potential at the downstream electrode 22 in an electrode pair 12 on the upstream side and the potential of the upstream electrode 21 in an electrode pair 12 on the downstream side can be made constantly equal. Further, because the lowest electrode 13 is disposed so as to have the same potential as the downstream electrode 22 in the most downstream electrode pair 12, the potential of the lowest electrode 13 and the potential of the downstream electrode 22 in the most downstream electrode pair 12 can be made constantly equal. As a result, discharge can be prevented from occurring between these electrodes and airflow in the direction opposite to that induced at each electrode pair 12 can be prevented.

The plasma actuator 10 is configured such that the polarity of voltage applied by the voltage application means 14 is inverted at adjacent electrode pairs 12. Thus, charge on one surface of the dielectric layer 11 deposited by discharge generated at each electrode pair 12 can be removed by the upstream electrode 21 in adjacent electrode pairs 12 on the downstream side. Further, the lowest electrode 13 is disposed so as to have the same potential as the downstream electrode 22 in the most downstream electrode pair 12. Thus, charge on one surface of the dielectric layer 11 deposited by discharge generated by the most downstream electrode pair 12 can be removed by the lowest electrode 13. Because of this, the charge on one surface of the dielectric layer 11 deposited by discharge generated at each electrode pair 12 can be prevented from impeding the flow induced at each electrode pair 12. As a result, induced flow can be accelerated upstream to downstream. Further, increasing the number of electrode pairs 12 can increase electrohydrodynamic force, which accelerate airflow. Thus, the plasma actuator 10 can control airflow and provide an increased effect of controlling airflow.

The plasma actuator 10 uses the voltage application means 14 to apply voltage obtained by superimposing AC voltage or repeated pulse voltage with DC voltage, and hence charge particles of discharge plasma generated by the AC voltage or repeated pulse voltage can be accelerated using the DC voltage. As a result, induced airflow can be further accelerated and an increased effect of controlling airflow can be achieved.

As reported in Non-patent Document 3, arranging a plurality of conventional plasma actuators in a row results in adjacent plasma actuators weakening electrohydrodynamic force and performance. In contrast, increasing the number of electrode pairs 12 in the plasma actuator 10 increases electrohydrodynamic force and greatly improves performance.

Increasing the number of electrode pairs 12 in the plasma actuator 10 provides the same effect as in the prior art, even if reducing voltage applied by the voltage application means 14. As a result, there is no need for a high-voltage device or similar device, the voltage application means 14 can be made smaller, and the plasma actuator 10 can be configured as a small, light and inexpensive device.

Figure 3:
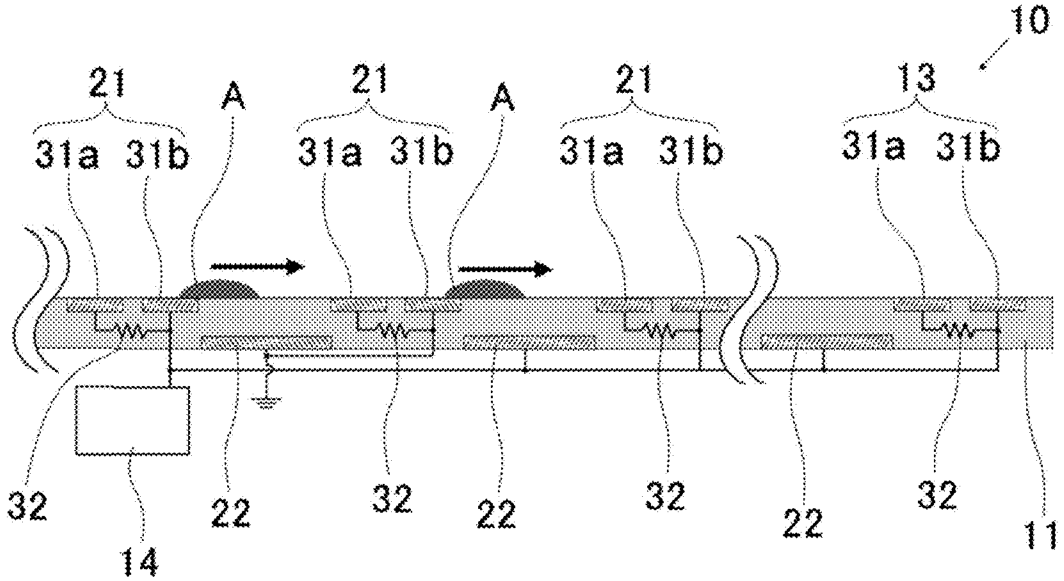
FIG. 3 is a cross-sectional diagram illustrating a modification example of the plasma actuator in FIG. 1, including a segmented electrode and a resistor when three or more pairs of electrodes are provided.
Figure 4:
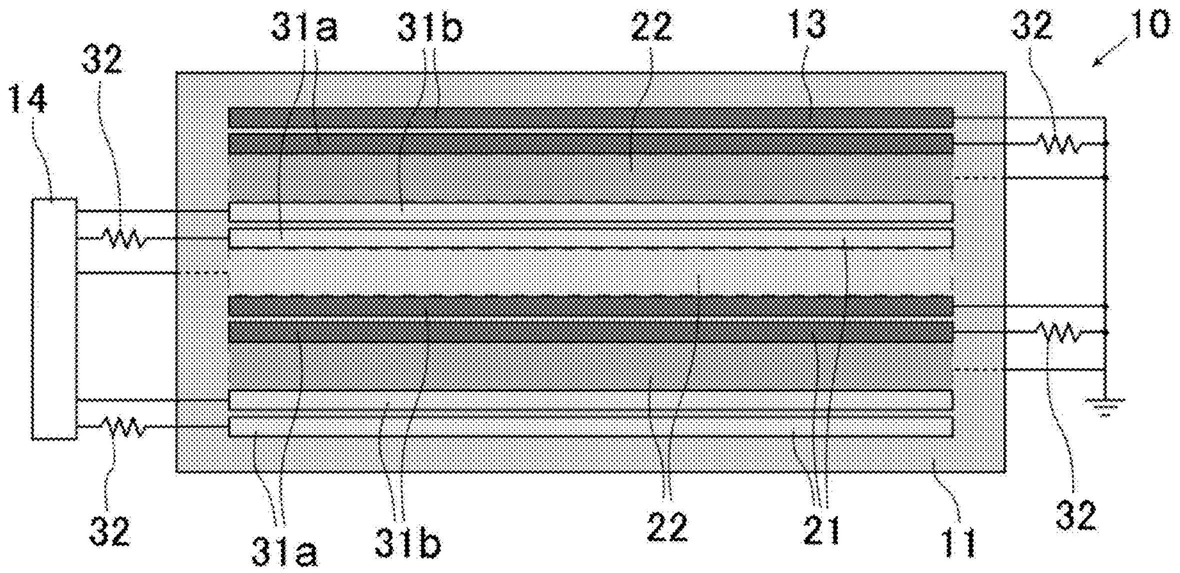
FIG. 4 is a plan view illustrating a modification example of the plasma actuator in FIG. 1 including a segmented electrode and a resistor when three pairs of electrodes are provided.

As illustrated in FIGS. 3 and 4, in the plasma actuator 10, the upstream electrode 21 and the lowest electrode 13 may be divided into a pair of separated electrodes 31*a*, 31*b* each disposed along a predetermined direction and the separated electrodes 31*a*, 31*b* in each pair on the upstream side or the downstream side may be coupled with a resistor 32. In this case, the resistor 32 can limit the current that flows through the separated electrodes 31*a*, 31*b* in each pair on the upstream side or the downstream side. With this configuration, the electric field formed between upstream electrodes 21 of adjacent electrode pairs 12 can be weakened and transition to arc discharge can be prevented even when the applied voltage is high or the interval between upstream electrodes 21 of adjacent electrode pairs 12 is small. The configuration illustrated in FIG. 3 is an example where three or more electrode pairs 12 are provided and the configuration illustrated in FIG. 4 is an example where three electrode pairs 12 are provided. However, only one electrode pair 12 may be provided, or two electrode pairs 12 may be provided. In a configuration where one electrode pair 12 is provided, the plasma actuator 10 is preferably configured such that the upstream electrode 21 is divided into the pair of separated electrodes 31*a*, 31*b*.

Example 1

Figure 5A:
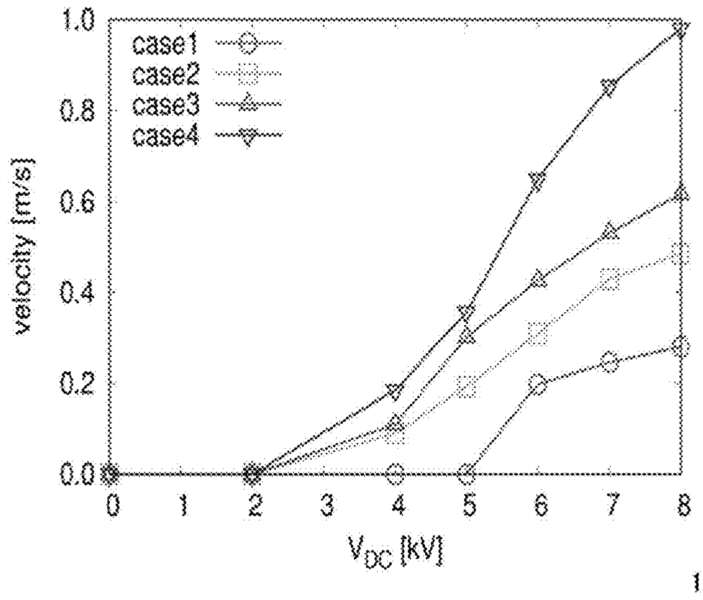
FIGS. 5A and 5B illustrate results of a performance evaluation test performed on the plasma actuator in FIG. 1 when the number of electrode pairs is changed, where
Figure 5B:
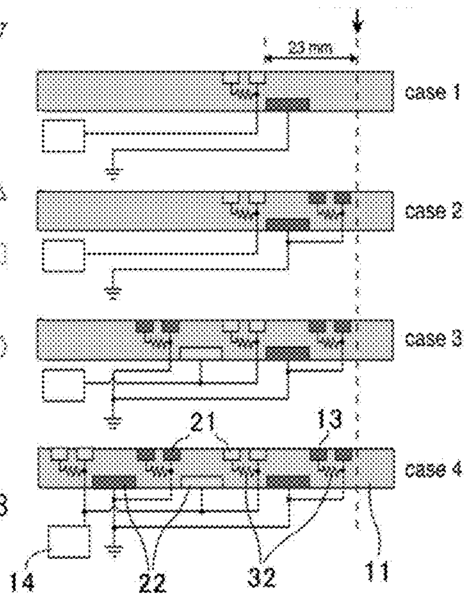

As illustrated in FIGS. 5A and 5B, a performance evaluation test was performed by operating plasma actuators 10 having a different number of electrode pairs 12 in a stationary gas. In the test, polyimide tape with a thickness of 320 μm (four layers of 80 μm polyimide tape stacked on top of each other) was used as the dielectric layer 11. Each upstream electrode 21 and the lowest electrode 13 had a width of 10 mm and were separated at an interval of 12 mm. In each downstream electrode 22, a region in which the upstream electrodes 21 on both sides and the lowest electrode 13 overlap was 0.2 mm. A pitot tube was used to measure downstream induced flow velocity in the plasma actuator 10. Flow velocity was measured at a position 2 mm from one surface of the dielectric layer 11 at a position (position indicated by the arrow in FIG. 5B) separated from a downstream edge of the upstream electrode 21 in the most downstream electrode pair by 23 mm on the downstream side along the one surface of the dielectric layer 11.

As illustrated in FIG. 5B, tests were carried out with a plasma actuator 10 having one electrode pair 12 (case 2), a plasma actuator 10 having two electrode pairs 12 (case 3), and a plasma actuator 10 having three electrode pairs 12 (case 4). Each of the upstream electrodes 21 and the lowest electrode 13 were divided into the separated electrodes 31*a*, 31*b* and each plasma actuator 10 was coupled to the resistor 32. As comparative examples, tests were also carried out with a plasma actuator 10 in the prior art having one electrode pair and not including the lowest electrode 13 (case 1). In order to test under the same conditions, a plasma actuator 10 in which the electrode on the upstream side was divided into the separated electrodes and coupled to a resistor was used for the comparative examples.

The results of the performance evaluation test are shown in FIG. 5A. As illustrated in FIG. 5A, it was found that induced flow velocity (velocity) increased in line with an increase in DC voltage ($V_{DC}$) in all cases 1 to 4. When comparing case 1 and case 2, it was evident that adding the lowest electrode 13 increased induced flow velocity. These results indicate that performance of the plasma actuator 10 increases when charge is prevented from accumulating on the downstream side of the electrode pair 12. The phenomenon reported in Non-patent Document 3 where adjacent electrode pairs 12 weaken mutual performance was not seen, and it was found that increasing the number of electrode pairs 12 actually enhanced mutual performance and increased induced flow velocity. Focusing on DC voltage at 8 kV, case 3 showed flow velocity approximately 1.3 times that in case 2, and case 4 showed flow velocity approximately 2 times that in case 2.

Modification Example of Voltage Application Means

Figure 6:
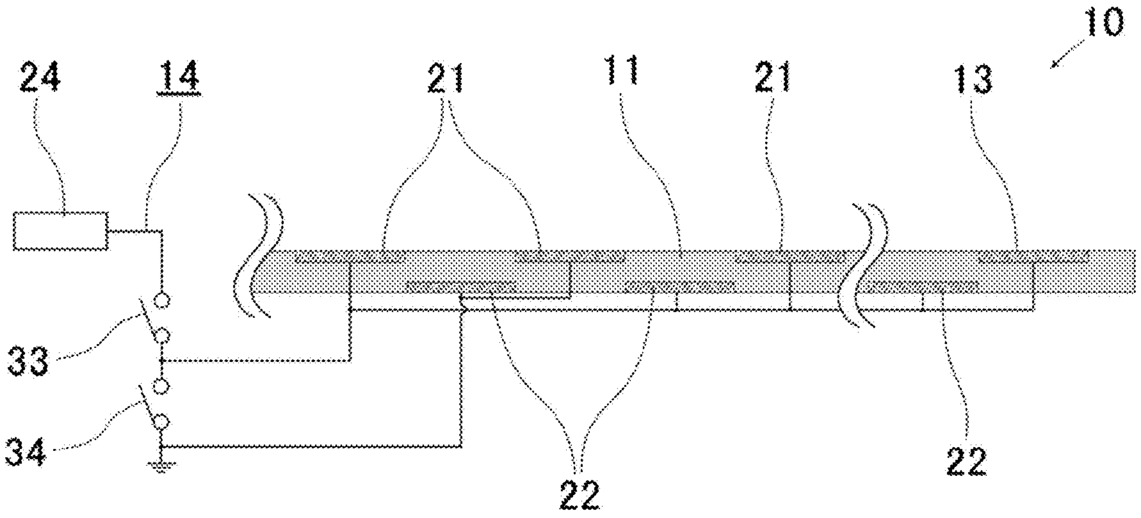
FIG. 6 is a circuit diagram illustrating a first modification example of voltage application means in the plasma actuator in FIG. 1.

As illustrated in FIG. 6, the voltage application means 14 in the plasma actuator 10 may be configured to include the DC power supply 24, a first switch 33 and a second switch 34, electrically couple either of the upstream electrode 21 or the downstream electrode 22 in each electrode pair 12 to the DC voltage 24 using the first switch 33 and ground that electrode using the second switch 34 such that the polarity of the applied voltage is inverted at adjacent electrode pairs 12, and ground the other of the upstream electrode 21 or the downstream electrode 22 in each electrode pair 12. The voltage application means 14 may further be configured to repeat an operation of turning on the first switch 33 and turning off the second switch 34 and turning off the first switch 33 and turning on the second switch 34. Even with such a configuration, the voltage obtained by superimposing repeated pulse voltage with DC voltage can be applied to each electrode pair 12. The first switch 33 and the second switch 34 may consist of a semiconductor element such as a MOSFET or an IGBT. In the example illustrated in FIG. 6, three or more electrode pairs 12 are provided, but one electrode pair 12 or two electrode pairs 12 may be provided.

Example 2

A performance evaluation test was performed in a in a stationary gas using the plasma actuator 10 illustrated in FIG. 6. In this test, polyimide tape with a thickness of 50 μm was used as the dielectric layer 11. The plasma actuator 10 included eight electrode pairs 12 and each upstream electrode 21 and the lowest electrode 13 had a width of 1.5 mm and were separated at an interval of 2.5 mm. In each downstream electrode 22, a region in which the upstream electrodes 21 on both sides and the lowest electrode 13 overlap was 0.2 mm. A SiC-MOSFET ("C2M1000170D" manufactured by Wolfspeed) was used for the first switch 33 and the second switch 34. Resistance of 10Ω was inserted between the DC voltage 24 and the first switch 33 to adjust the rise time of the pulse voltage.

In the test, voltage applied by the voltage application means 14 was measured using a high-voltage probe ("PHV4002-3" manufactured by PMK) and the current flowing through each electrode pair 12 at that time was measured using a Rogowski coil ("model 2877" manufactured by Pearson). Voltage and current waveforms were obtained using a digital oscilloscope.

Figure 7:
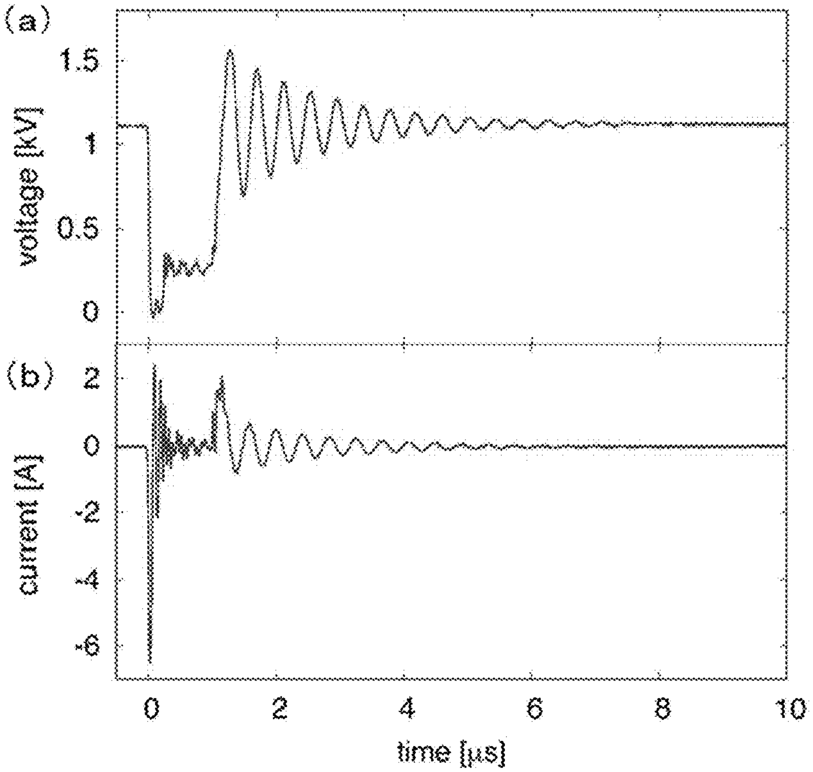
FIG. 7 illustrates results of a performance evaluation test performed on the plasma actuator in FIG. 6, where (a) of FIG. 7 is a graph showing a voltage waveform applied using voltage application means and (b) of FIG. 7 is a graph showing a voltage waveform that flows in each electrode during the performance evaluation test.

Voltage and current waveforms obtained when the plasma actuator 10 was driven while DC power supply 24 voltage was 1200 V are shown in FIG. 7. As illustrated in FIG. 7, before a time t=0 μs, the first switch 33 is on and the second switch 34 is off. At t=0 μs, the first switch 33 is turned off and the second switch 34 is turned on. As a result, voltage instantaneously drops to 0 V. Then, the first switch 33 is again turned on and the second switch 34 is again turned off. The first switch 33 is turned on approximately 1 μs after the second switch 34 is turned off because a large current may flow from the DC power supply 24 when these two switches are simultaneously turned on. It was found that the current value reached a negative peak (approximately −6 A) and negative-polarity discharge occurred at the stage at which voltage dropped. At the stage where voltage increased, it was found that the current value reached a positive peak (approximately 2 A) and positive-polarity discharge occurred. From these results, it can be said that voltage obtained by superimposing pulse voltage with DC voltage can also be applied with the voltage application means 14 illustrated in FIG. 6.

Figure 8A:
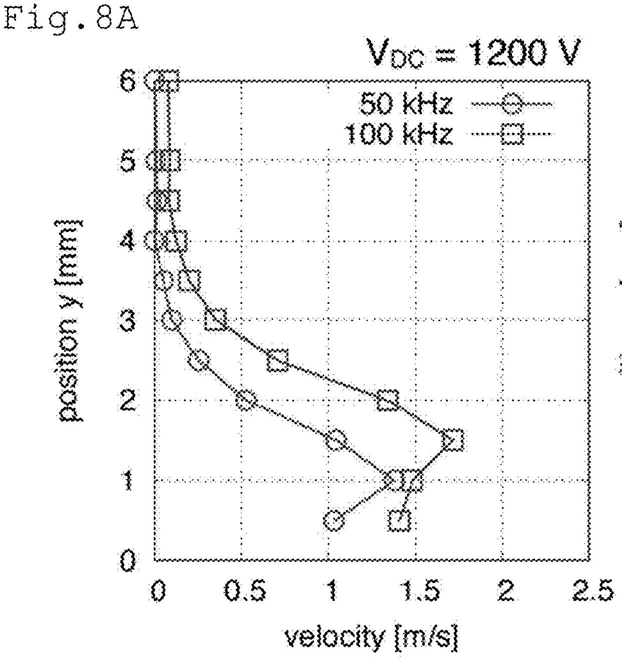
FIGS. 8A and 8B illustrate results of a performance evaluation test performed on the plasma actuator in FIG. 6, where
Figure 8B:
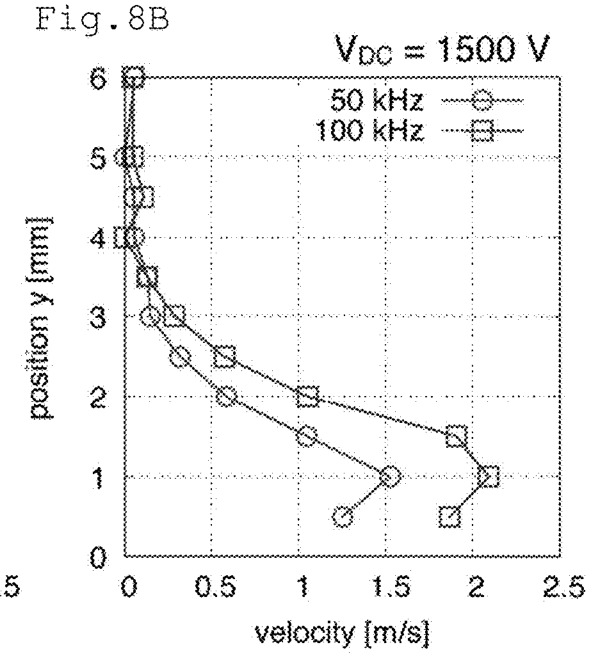

Next, the plasma actuator 10 was driven when frequency of the repeated pulse voltage was 50 kHz and 100 kHz, and when the DV voltage was 1200 V and 1500 V. Profiles in the y-direction (direction perpendicular to the surface of the dielectric layer 11) of the velocity of induced flow in the x-direction (direction along the surface of the dielectric layer 11) were obtained and are shown in FIGS. 8A and 8B. FIGS. 8A and 8B show a profile at a position downstream of the lowest electrode 13 by 1 mm. As illustrated in FIGS. 8A and 8B, it was found that flow at a velocity of 1 m/s or greater was induced when the DC voltage was 1200 V and 1500 V. In particular, the maximum velocity of induced flow was 2 m/s when DC voltage was 1500 V and the frequency of the repeated pulse voltage was 100 kHz and a velocity approximately equal to that of the plasma actuator in the prior art applied with voltage of 10 kV or greater was obtained. Thus, it is conceivable that the plasma actuator 10 achieves control effects with an applied voltage of 1500 V similar to that when voltage of 10 kV or greater is applied, as in the prior art. As a result, the voltage application means 14 in the plasma actuator 10 can be made smaller than in the prior art and the plasma actuator 10 can be configured as a smaller, lighter and more inexpensive device.

Figure 9:
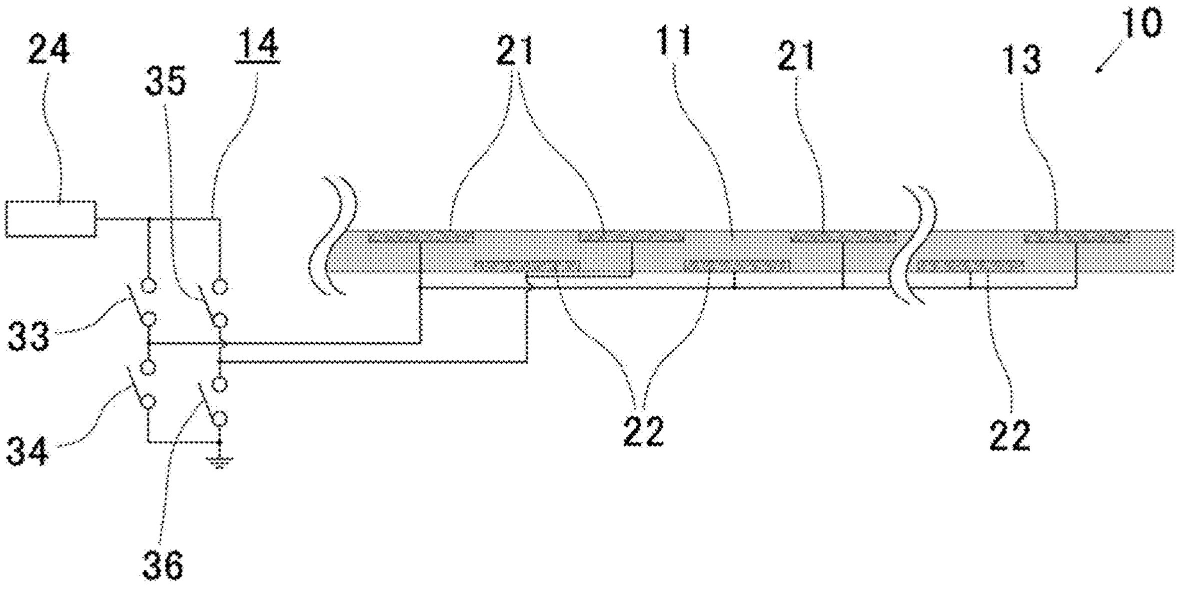
FIG. 9 is a circuit diagram illustrating a second modification example of voltage application means in the plasma actuator in FIG. 1.

As illustrated in FIG. 9, the plasma actuator 10 may be configured such that the voltage application means 14 includes the DC power supply 24, the first switch 33, the second switch 34, a third switch 35 and a fourth switch 36, and either of the upstream electrode 21 or the downstream electrode 22 in each electrode pair 12 is electrically coupled to the DC power supply 24 via the first switch 33 and grounded via the second switch 34 such that the polarity of applied voltage is inverted at adjacent electrode pairs 12. Further, the plasma actuator 10 may be configured such that the other of the upstream electrode 21 and the downstream electrode 22 in each electrode pair 12 is electrically coupled to the DC power supply 24 via the third switch 35 and grounded via the fourth switch 36, and that an operation in which the first switch 33 and the fourth switch 36 are turned on and the second switch 34 and the third switch 35 are turned off, and the first switch 33 and the fourth switch 36 are turned off and the second switch 34 and the third switch 35 are turned on is repeated. Even with such a configuration, voltage obtained by superimposing repeated pulse voltage with DC voltage can be applied to each electrode pair 12. Further, when the pulse voltage is applied, the difference in potential between the upstream electrode 21 and the downstream electrode 22 of each electrode pair 12 can be made larger and the amount of generated plasma can be increased. As a result, a larger flow can be induced. In the example illustrated in FIG. 9, three or more electrode pairs 12 are provided, but one electrode pair 12 or two electrode pairs 12 may be provided.

INDUSTRIAL APPLICABILITY

The plasma actuator according to the present invention can be used to control flow around wings of an aircraft, blades of a wind turbine, or blades of a gas turbine, for example. The plasma actuator according to the present invention is a smaller, lighter and more inexpensive device than devices in the prior art, and hence the space required to implement active airflow control technology using a plasma actuator can be reduced and industrial application on a larger scale can be promoted.

REFERENCE SIGNS LIST

10: Plasma actuator
11: Dielectric layer
12: Electrode pair
21: Upstream electrode
22: Downstream electrode
13: Lowest electrode
14: Voltage application means
23: AC power supply/pulse power supply
24: DC power supply
25: High-pass filter
26: Low-pass filter
31*a*, 31*b*: Separated electrode
32: Resistor
33: First switch
34: Second switch
35: Third switch
36: Fourth switch

What is claimed is:

1. A plasma actuator comprising:
a dielectric layer;
a plurality of electrode pairs disposed on the dielectric layer upstream to downstream in a predetermined direction along one surface of the dielectric layer;
a lowest electrode disposed on the dielectric layer on a downstream side of all of the plurality of electrode pairs; and
voltage application means configured to apply voltage including AC voltage or repeated pulse voltage to said each of the plurality of electrode pairs,
said each of the plurality of electrode pairs including:
an upstream electrode disposed closer to said one surface of the dielectric layer; and
a downstream electrode disposed closer to another surface of the dielectric layer and displaced downstream from the upstream electrode so as to sandwich the dielectric layer between the upstream electrode and the downstream electrode,
wherein, in adjacent electrode pairs including an upstream electrode pair and a downstream electrode pair, the upstream electrode of the downstream electrode pair is displaced downstream from the downstream electrode of the upstream electrode pair,
wherein the lowest electrode is disposed closer to the one surface of the dielectric layer and displaced downstream from the downstream electrode in a most downstream electrode pair so as to constantly have a potential equal to a potential of the downstream electrode in the most downstream electrode pair, and
wherein the voltage application means is configured to apply the voltage such that polarity of the applied voltage is inverted at the adjacent electrode pairs.

2. The plasma actuator according to claim 1, wherein the voltage application means is configured to, when applying the voltage to either of the upstream electrode or the downstream electrode in said each of the plurality of electrode pairs, ground one of the upstream electrode or downstream electrode in said each of the plurality of electrode pairs.

3. The plasma actuator according to claim 1, wherein the voltage application means is configured to, when applying the voltage between the upstream electrode of an odd-numbered electrode pair from an upstream side and the downstream electrode of an even-numbered electrode pair from the upstream side, ground the downstream electrode in the odd-numbered electrode pair from the upstream side and the upstream electrode in the even-numbered electrode pair from the upstream side and/or configured to, when applying the voltage between the downstream electrode of the odd-numbered electrode pair from the upstream side and the upstream electrode of the even-numbered electrode pair from the upstream side, ground the upstream electrode in the odd-numbered electrode pair from the upstream side and the downstream electrode in the even-numbered electrode pair from the upstream side.

4. The plasma actuator according to claim 1, wherein the voltage is voltage obtained by superimposing the AC voltage or the repeated pulse voltage with DC voltage.

5. The plasma actuator according to claim 4, wherein:

the voltage application means includes a DC power supply, a first switch, and a second switch; and the voltage application means is configured such that either of the upstream electrode and the downstream electrode in said each of the plurality of electrode pairs is electrically coupled to the DC power supply via the first switch and grounded via the second switch, one of the upstream electrode and the downstream electrode in said each of the plurality of electrode pairs is grounded, and an operation in which the first switch is turned on and the second switch is turned off, and the first switch is turned off and the second switch is turned on is repeated.

6. The plasma actuator according to claim 4, wherein:

the voltage application means includes a DC power supply, a first switch, a second switch, a third switch, and a fourth switch; and the voltage application means is configured such that either of the upstream electrode and the downstream electrode in said each of the plurality of electrode pairs is electrically coupled to the DC power supply via the first switch and ground via the second switch, one of the upstream electrode and the downstream electrode in said each of the plurality of electrode pairs is electrically coupled to the DC power supply via the third switch and grounded via the fourth switch, and an operation in which the first switch and the fourth switch are turned on and the second switch and the third switch are turned off, and the first switch and the fourth switch are turned off and the second switch and the third switch are turned on is repeated.

7. The plasma actuator according to claim 1, wherein:

the upstream electrode and the lowest electrode are divided into a pair of separated electrodes aligned in the predetermined direction; and a separated electrode on an upstream side or a downstream side in each of said pair of separated electrodes is coupled to a resistor.

* * * * *